United States Patent
Katine

(10) Patent No.: US 8,914,970 B2
(45) Date of Patent: Dec. 23, 2014

(54) METHOD FOR MAKING A TUNNELING MAGNETORESISTIVE (TMR) SENSOR

(71) Applicant: HGST Netherlands B.V., Amsterdam (NL)

(72) Inventor: Jordan Asher Katine, Mountain View, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/869,005

(22) Filed: Apr. 23, 2013

(65) Prior Publication Data

US 2014/0313617 A1 Oct. 23, 2014

(51) Int. Cl.
*G11B 5/127* (2006.01)
*H04R 31/00* (2006.01)
*G11B 5/39* (2006.01)

(52) U.S. Cl.
CPC ............ *G11B 5/3932* (2013.01); *G11B 5/3909* (2013.01); *G11B 58/8404* (2013.01)
USPC .................. 29/603.16; 29/603.11; 29/603.13; 29/603.14; 29/603.15; 29/603.18; 216/22; 216/39; 216/40; 360/324.11; 360/324.12

(58) Field of Classification Search
USPC ............... 29/603.07, 603.08, 603.11–603.16, 29/603.18; 216/22, 39, 40; 360/324.11, 360/324.12
See application file for complete search history.

(56) References Cited

U.S. PATENT DOCUMENTS

| | | | | |
|---|---|---|---|---|
| 5,684,308 | A * | 11/1997 | Lovejoy et al. | ............... 257/184 |
| 6,495,413 | B2 * | 12/2002 | Sun et al. | ...................... 438/240 |
| 6,872,467 | B2 | 3/2005 | Qian | |
| 7,126,796 | B2 | 10/2006 | Lin | |
| 7,225,524 | B2 * | 6/2007 | Lee et al. | ........................ 29/594 |
| 7,329,362 | B2 | 2/2008 | Cyrille | |
| 7,346,977 | B2 | 3/2008 | Cyrille et al. | |
| 7,420,787 | B2 | 9/2008 | Freitag et al. | |

(Continued)

OTHER PUBLICATIONS

Moneck et al. "Development of Methanol Based Reactive Ion Etching Processes for Nanoscale Magnetic Devices", Nanotechnology 2011: Electronics, Devices, Fabrication, MEMS, Fluidics and Computational Chapter 4: NanoFab: Manufacturing & Instrumentation.

(Continued)

*Primary Examiner* — Paul D Kim
(74) *Attorney, Agent, or Firm* — Thomas R. Berthold

(57) ABSTRACT

A tunneling magnetoresistive sensor has an extended pinned layer wherein both the MgO spacer layer and the underlying ferromagnetic pinned layer extend beyond the back edge of the ferromagnetic free layer in the stripe height direction and optionally also beyond the side edges of the free layer in the trackwidth direction. A patterned photoresist layer with a back edge is formed on the sensor stack and a methanol ($CH_3OH$)-based reactive ion etching (RIE) removes the unprotected free layer, defining the free layer back edge. The methanol-based RIE terminates at the MgO spacer layer without damaging the underlying reference layer. A second patterned photoresist layer may be deposited and a second methanol-based RIE may be performed if it is desired to have the reference layer also extend beyond the side edges of the free layer in the trackwidth direction.

6 Claims, 8 Drawing Sheets

(56) References Cited

U.S. PATENT DOCUMENTS

| | | |
|---|---|---|
| 7,444,739 B2 | 11/2008 | Feldbaum |
| RE40,951 E | 11/2009 | Kodaira et al. |
| 7,978,441 B2 | 7/2011 | Lin |
| 8,318,030 B2 | 11/2012 | Peng et al. |
| 2003/0231437 A1 | 12/2003 | Childress et al. |
| 2007/0035891 A1 | 2/2007 | Freitag |

OTHER PUBLICATIONS

Maehara et al., "Study on Micro-Fabrication Processes in CoFeB/MgO/CoFeB Magnetic Tunnel Junctions", Magnetics Conference, 2005. Intermag Asia 2005. Digests of the IEEE International, pp. 1535-1536.

* cited by examiner

US 8,914,970 B2

METHOD FOR MAKING A TUNNELING MAGNETORESISTIVE (TMR) SENSOR

BACKGROUND OF THE INVENTION

1. Field of the Invention

The invention relates generally to a current-perpendicular-to-the-plane (CPP) tunneling magnetoresistive (MR) sensor, and more particularly to a CPP-TMR sensor with s pinned layer that extends beyond the stripe height (SH) and optionally the trackwidth (TW) of the free layer, and to a method for making the sensor.

2. Background of the Invention

One type of conventional current-perpendicular-to-the-plane (CPP) magnetoresistive sensor used as the read head in magnetic recording disk drives is a magnetic tunnel junction sensor, also called a tunneling MR or TMR sensor. A TMR sensor has a stack of layers that includes two ferromagnetic layers separated by a tunneling barrier layer, i.e., a nonmagnetic electrically insulating spacer layer, which is typically MgO. One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of external magnetic fields from recorded data on the disk and is referred to as the free layer. With a sense current applied perpendicularly through the sensor layers, the rotation of the free-layer magnetization relative to the reference-layer magnetization due to the presence of external magnetic fields is detectable as a change in electrical resistance.

In a CPP-TMR read head, the magnetization of the reference layer is generally orthogonal to the disk-facing surface and the magnetization of the free layer, in the absence of external magnetic fields, is parallel to the disk-facing surface. A CPP-TMR read head may have an extended pinned layer, meaning that the reference layer extends beyond the free layer back edge, i.e., the edge recessed from the disk-facing surface. The reference layer may also extend beyond the free layer side edges in the trackwidth direction, i.e., the direction parallel to the disk-facing surface. However, the conventional method for making a CPP-TMR read head with an extended pinned layer often results in a back edge having an undesirable profile and with removal of a portion of the reference layer. Variations in the profile of the back edge can result in an inaccurate stripe height, i.e. the free layer dimension between the disk-facing surface and the back edge, and removal of a portion of the reference layer can adversely affect the pinning of the reference layer.

What is needed is a CPP-TMR sensor that has a free layer with a precise back edge and an extended reference layer with no material removal, and to a method for making the sensor.

SUMMARY OF THE INVENTION

The invention relates to a CPP-TMR sensor with an extended pinned layer. Both the MgO spacer layer and the underlying ferromagnetic reference layer extend beyond the back edge of the ferromagnetic free layer in the stripe height direction and optionally also beyond the side edges of the free layer in the trackwidth direction. A patterned photoresist layer with a back edge is formed on the sensor stack and a methanol (CH$_3$OH)-based reactive ion etching (RIE) removes the unprotected free layer, defining the free layer back edge. The methanol-based RIE terminates at the MgO spacer layer without damaging the underlying reference layer. A second patterned photoresist layer may be deposited and a second methanol-based RIE may be performed if it is desired to have the reference layer also extend beyond the side edges of the free layer in the trackwidth direction. Termination of the methanol-based RIE when the MgO layer is detected prevents any removal of the MgO so the MgO layer has the same thickness in the region below the free layer as it has in the extended regions beyond the back edge and side edges.

For a fuller understanding of the nature and advantages of the present invention, reference should be made to the following detailed description taken together with the accompanying figures.

DETAILED DESCRIPTION OF THE INVENTION

Figure 1:
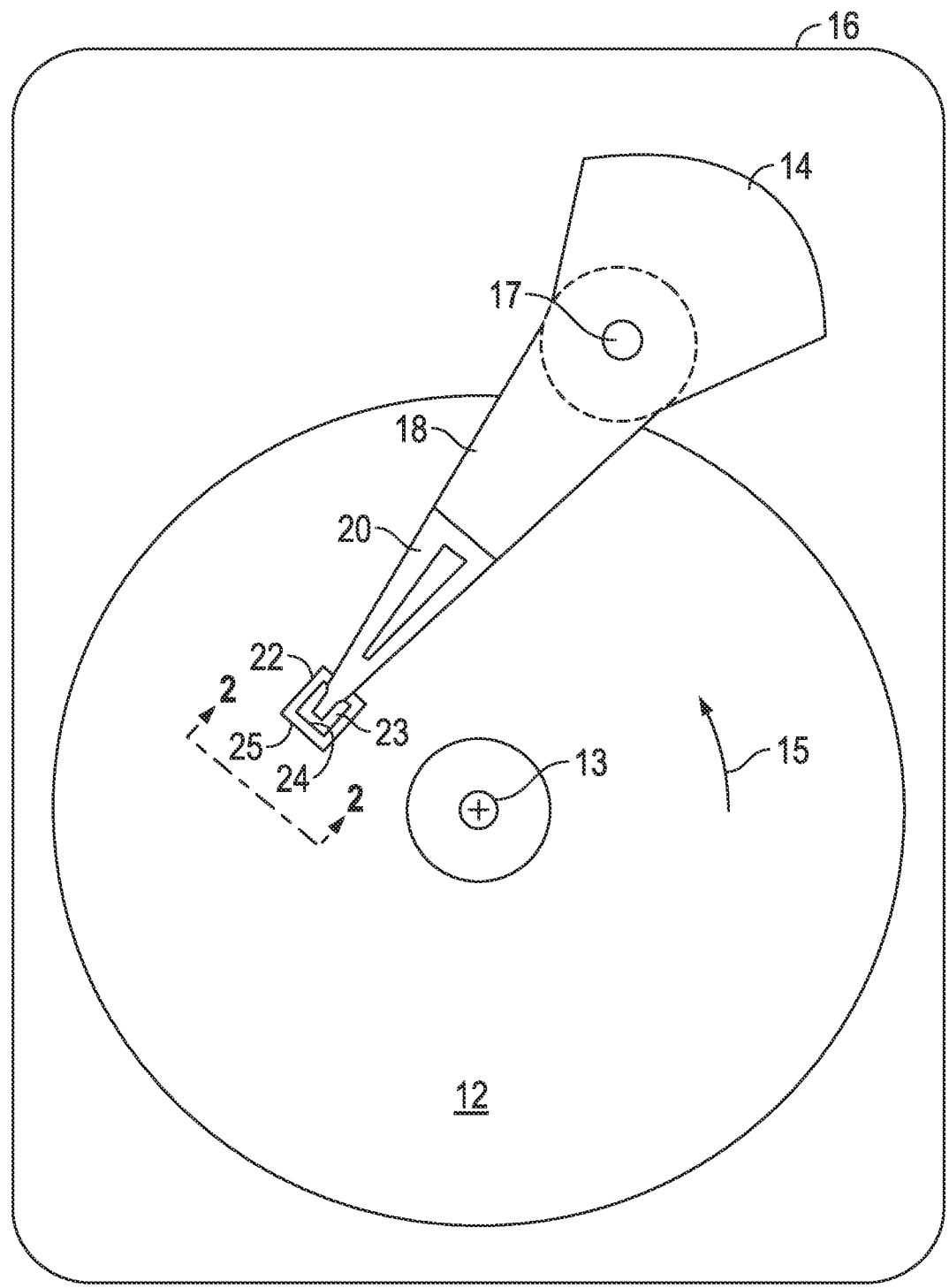
FIG. 1 is a schematic top view of a conventional magnetic recording hard disk drive with the cover removed.

The CPP tunneling magnetoresistive (TMR) sensor of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
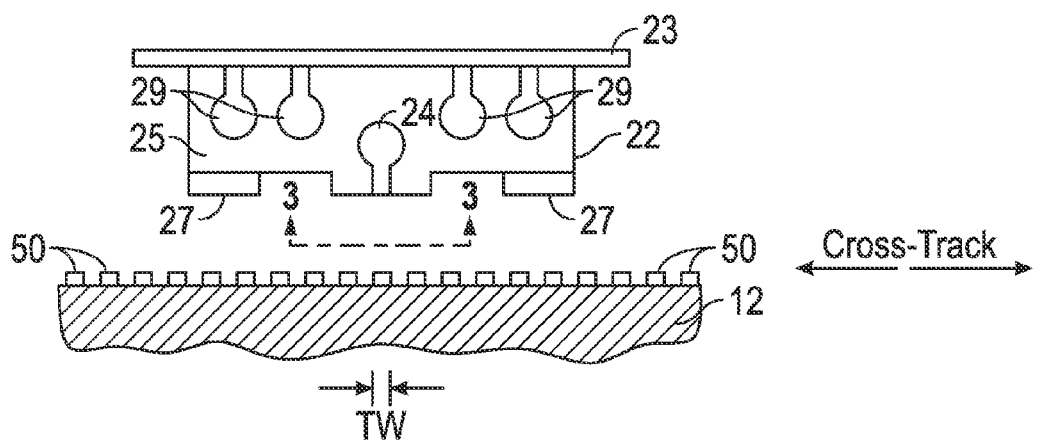
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric magnetic data tracks with track width TW are created when the write head writes on the continuous recording layer.

Figure 3:
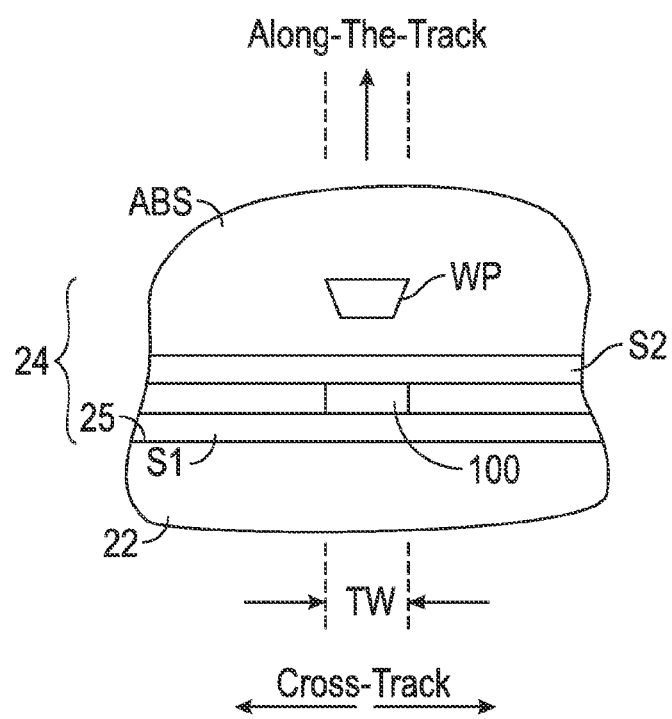
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The CPP-MR sensor or read head 100 is located between two magnetic shields S1 and S2. The shields S1, S2 are formed of soft magnetically permeable material, typically a NiFe alloy, and may also be electrically conductive so they can function as the electrical leads to the read head 100. The shields function to shield the read head 100 from recorded data bits in the along-the-track direction that are neighboring the data bit being read. Separate electrical leads may also be used, in which case the read head 100 is formed in contact with layers of electrically conducting lead material, such as tantalum, gold, or copper, that are in contact with the shields S1, S2. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4A:
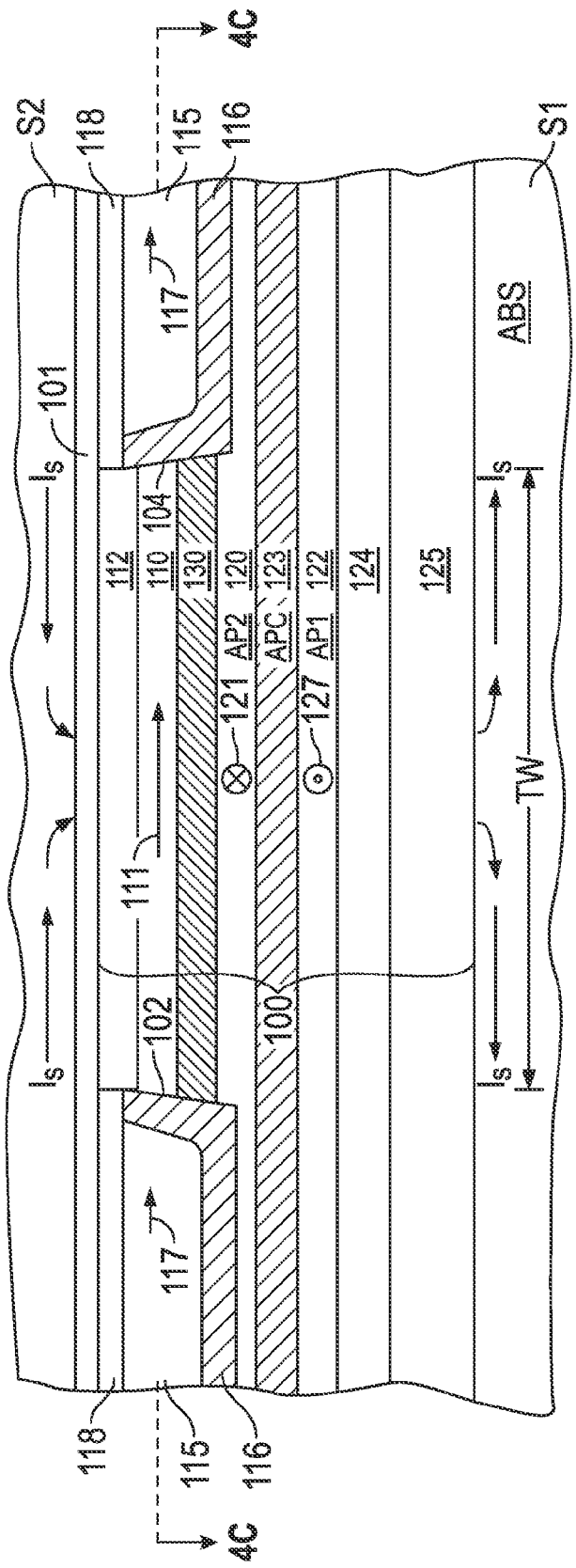
FIG. 4A is a cross-sectional schematic view of a CPP-TMR read head with an extended pinned layer showing the stack of layers between the magnetic shield layers according to the prior art.

FIG. 4A is view of the ABS showing the layers making up a CPP-TMR sensor structure with an extended pinned layer as would be viewed from the disk. Sensor 100 is a CPP-TMR read head comprising a stack of layers formed between the two magnetic shield layers S1, S2. The sensor 100 has a front edge at the ABS. The shields S1, S2 are formed of an electrically conductive magnetic material and thus may also function as electrical leads for the sense current $I_S$, which is directed generally perpendicularly through the layers in the sensor stack. Alternatively, separate electrical lead layers may be formed between the shields S1, S2 and the sensor stack. The lower shield S1 is typically polished by chemical-mechanical polishing (CMP) to provide a smooth substrate for the growth of the sensor stack. A seed layer 101, such as a thin Ru/NiFe bilayer, is deposited, typically by sputtering, below S2 to facilitate the electroplating of the relatively thick S2. The Ru layer is used to adjust the magnetic read gap and the NiFe layer functions as the plating seed for S2, which typically also is a NiFe alloy such as permalloy.

The sensor 100 layers include a reference ferromagnetic layer 120 having a fixed magnetic moment or magnetization direction 121 oriented generally orthogonal to the ABS (into the page), a free ferromagnetic layer 110 having a magnetic moment or magnetization direction 111 that can rotate in the plane of layer 110 in response to external magnetic fields from the disk 12, and a nonmagnetic electrically insulating spacer layer 130, typically formed of magnesium oxide (MgO), between the reference layer 120 and free layer 110. The free layer 110 has spaced-apart side edges 102, 104 which essentially defines the physical track width (TW) of sensor 100.

The reference ferromagnetic layer 120 in a CPP-TMR sensor may be a single or "simple" pinned layer or part of an antiparallel (AP) pinned structure. FIG. 4A depicts a well-known AP-pinned structure with reference ferromagnetic layer 120 (AP2) and a lower ferromagnetic layer 122 (AP1) that are antiferromagnetically coupled across an AP coupling (APC) layer 123. The APC layer 123 is typically Ru, Ir, Rh, Cr or alloys thereof. The AP1 and AP2 layers, as well as the free ferromagnetic layer 110, are typically formed of crystalline CoFeB, CoFe or NiFe alloys, or a multilayer of these materials, such as a CoFe/NiFe bilayer. The AP1 and AP2 ferromagnetic layers 122, 120 have their respective magnetization directions 127, 121 oriented antiparallel. The AP1 layer 122 may have its magnetization direction pinned by being exchange-coupled to an antiferromagnetic (AF) layer 124 as shown in FIG. 4A. The AF layer 124 is typically a Mn alloy, e.g., PtMn, NiMn, FeMn, IrMn, PdMn, PtPdMn or RhMn. It is desirable that the AP1 and AP2 layers have similar moments. This assures that the net magnetic moment of the AP-pinned structure is small so that magnetostatic coupling to the free layer 110 is minimized and the effective pinning field of the AF layer 124, which is approximately inversely proportional to the net magnetization of the AP-pinned structure, remains high. In a single or simple pinned layer, the reference layer 120 would be in contact with and pinned by AF layer 124.

A seed layer 125 may be located between the lower shield layer S1 and the AP-pinned structure to enhance the growth of the AF layer 124. The seed layer 125 is typically one or more layers of NiFeCr, NiFe, Ta, Cu or Ru. A capping layer 112 is located between the free ferromagnetic layer 110 and the upper shield layer S2. The capping layer 112 provides corrosion protection and may be a single layer or multiple layers of different materials, such as Ru, Ta, Ti, Ir, or a Ru/Ta/Ru, Ru/Ti/Ru, or Cu/Ru/Ta trilayer.

In the presence of an external magnetic field in the range of interest, i.e., magnetic fields from recorded data on the disk, the magnetization direction 111 of free layer 110 will rotate while the magnetization direction 121 of reference layer 120 will remain fixed and not rotate. Thus when a sense current $I_S$ is applied from top shield S2 perpendicularly through the sensor stack to bottom shield S1 (or from S1 to S2), the magnetic fields from the recorded data on the disk will cause rotation of the free-layer magnetization 111 relative to the reference-layer magnetization 121, which is detectable as a change in electrical resistance.

A ferromagnetic biasing layer 115, such as a CoPt or CoCrPt hard magnetic bias layer, is also typically formed outside near the side edges 102, 104 of the free layer 110. The biasing layer 115 is electrically insulated from side edges 102, 104 by insulating layer 116, which is typically alumina ($Al_2O_3$) or a silicon nitride ($SiN_x$). A capping layer 118, such as layer of Cr, or a multilayer of Ta/Cr is deposited on top of the biasing layer 115. The upper layer of capping layer 118, for example Cr, also serves the purpose as a chemical-mechanical-polishing (CMP) stop layer during fabrication of the sensor. The biasing layer 115 has a magnetization 117 generally parallel to the ABS and thus longitudinally biases the magnetization 111 of the free layer 110. Thus in the absence of an external magnetic field the magnetization 111 of the free layer 110 is parallel to the magnetization 117 of biasing layer 115.

Figure 4B:
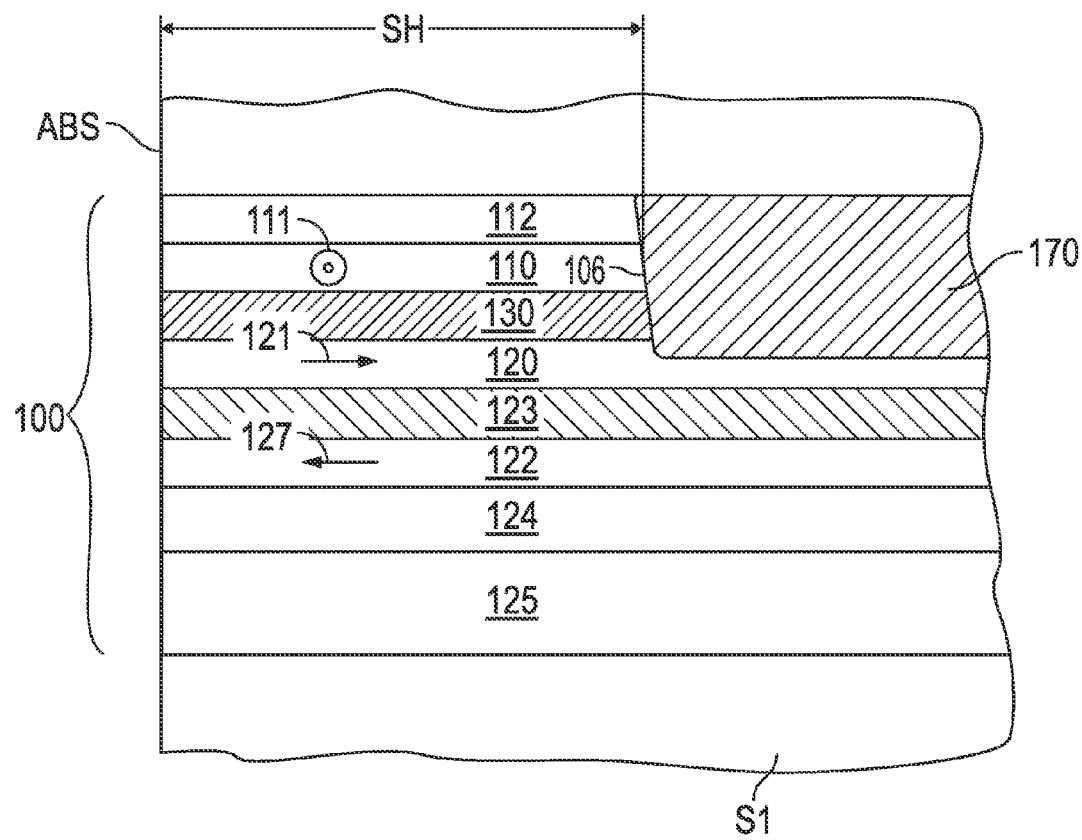
FIG. 4B is a sectional view of the CPP-TMR read head of FIG. 4A taken through a plane orthogonal to both the air-bearing surface (ABS) and to the planes of the layers in the sensor stack.

FIG. 4B is a sectional view of the CPP-TMR sensor structure of FIG. 4A taken through a plane orthogonal to both the ABS and to the planes of the layers in the sensor stack. The free layer 110 has a back edge 106 recessed from the ABS by a distance that defines the stripe height (SH) of the free layer 110. A layer 170 of insulating backfill material, typically alumina, is formed on the reference layer 120 and adjacent the back edge 106 of the free layer 110.

Figure 4C:
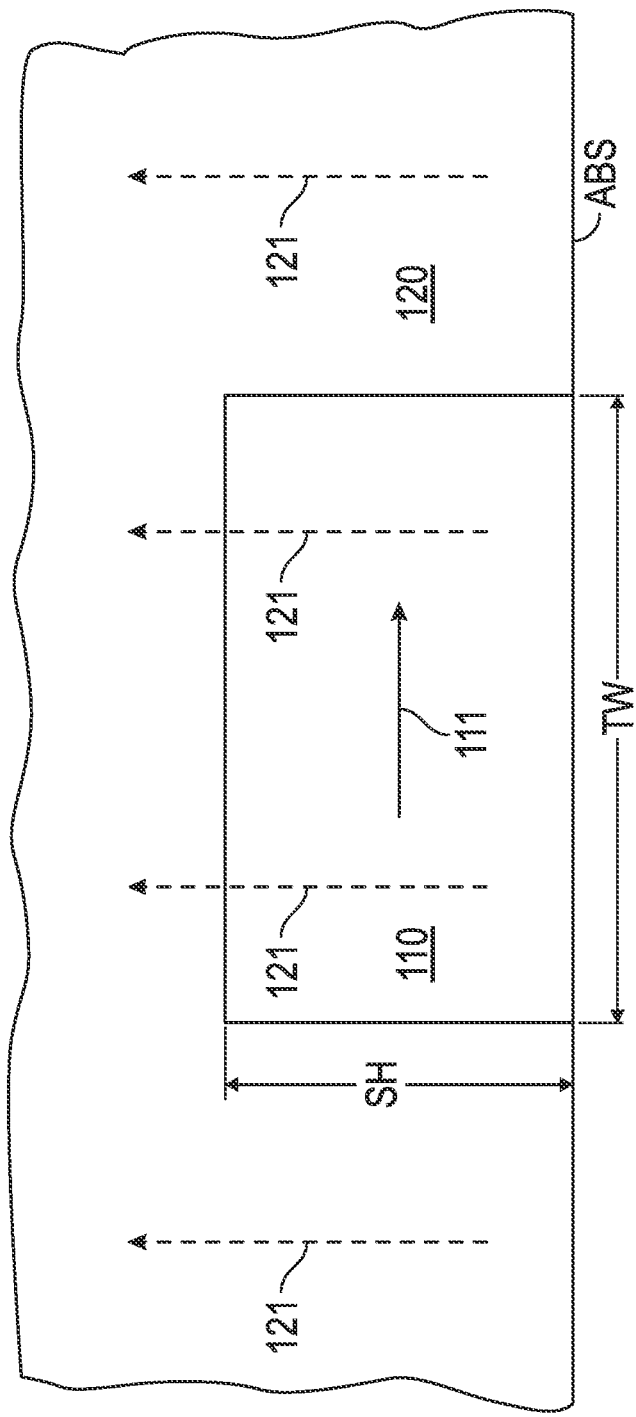
FIG. 4C is a top view of section 4C-4C of FIG. 4A but with the biasing layer and insulating layer removed to show the extended reference layer.

The CPP-TMR sensor 100 in FIGS. 4A-4B has an extended pinned layer, meaning that the reference layer 120 extends beyond the free layer 110 back edge 106 in the SH direction and optionally also beyond the free layer 100 side edges 102, 104 in the TW direction. This is depicted in FIG. 4C which is a top view of section 4C-4C of FIG. 4A but with the biasing layer 115 and insulating layer 116 removed, so that the reference layer 120 can be viewed.

Referring to FIG. 4B, the CPP-TMR sensor 100 with extended pinned layer 120 is fabricated by lithographically patterning a photoresist layer on capping layer 112 with a back edge corresponding to back edge 106 of free layer 100 and then ion milling through the capping layer 112, free layer 110, and MgO spacer layer 130. The region milled away is then backfilled with insulating material 170. Referring to FIG. 4A, a second photoresist is then lithographically patterned on capping layer 112 with side edges corresponding to side edges 102, 104 of free layer 100, followed by ion milling through the capping layer 112, free layer 110, and spacer layer 130. The region milled away is then filled with insulating layer 116, biasing layer 115 and capping layer 118. After chemical-mechanical polishing (CMP), the seed layer 101 is deposited, followed by deposition of shield layer S2, which may be electroplated.

Since the selectivity in the milling rates between the MgO material of spacer layer 130 and the ferromagnetic material of free layer 110 is not very great and because the MgO spacer layer 130 is only approximately 1 nm thick, it is difficult to stop the ion milling precisely at the reference layer 120. As depicted in FIGS. 4A-4B, the ion milling has also resulted in removal of a portion of the thickness of reference layer 120. Also, redeposition of etched material during the ion milling process makes it difficult to precisely control the profile of the back edge 106. Variations in the profile of the back edge can result in an inaccurate SH for the free layer 110, and removal of a portion of the reference layer 120 can adversely affect the pinning of the reference layer 120.

Figure 5A:
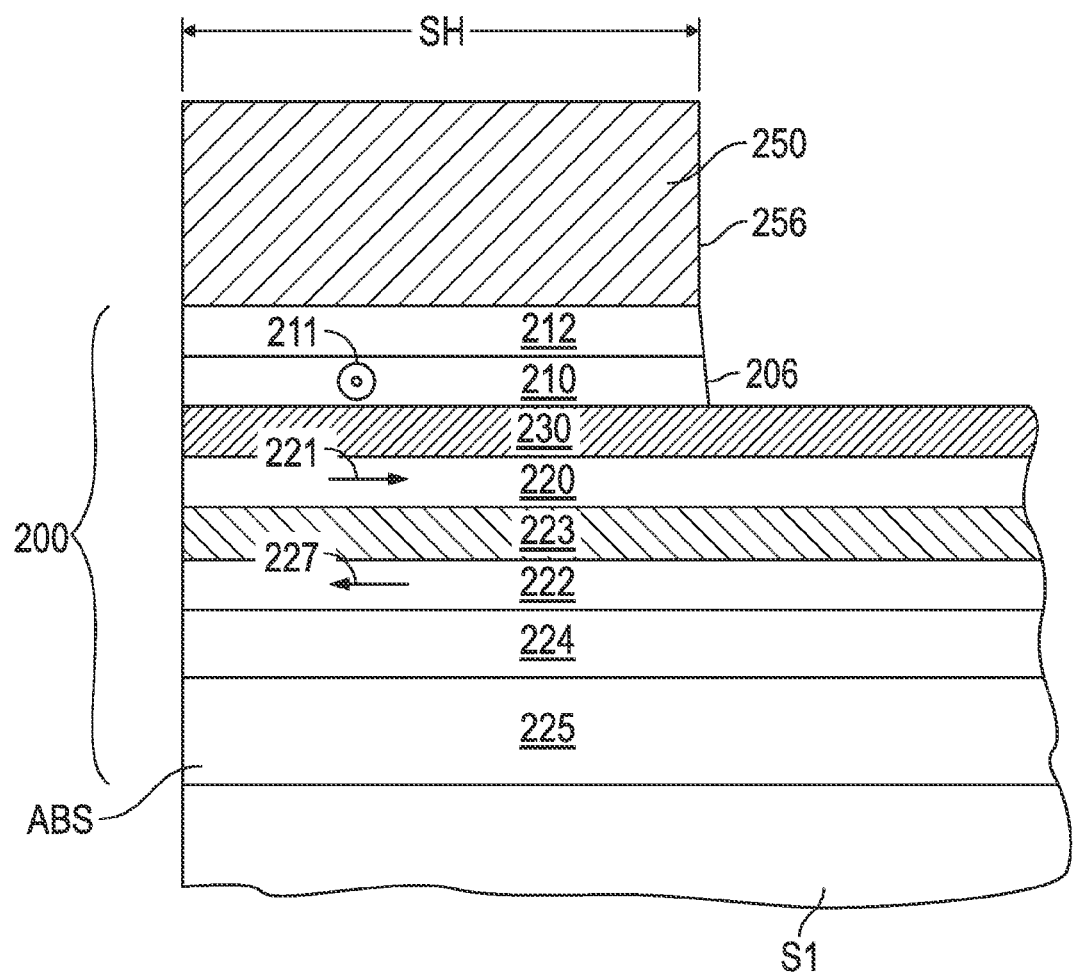
FIG. 5A is a cross-sectional schematic view showing the layers of the CPP-TMR read head with extended pinned layer according to the invention after deposition of a patterned photoresist layer and after methanol (CH$_3$OH)-based reactive ion etching (RIE) to define the free layer stripe height (SH) according to the method of the invention.

In this invention, the CPP-TMR sensor with extended pinned layer has both the MgO spacer layer and the underlying reference layer extending beyond the back edge of the free layer and optionally also beyond the side edges of the free layer. FIG. 5A shows the layers of the sensor on first shield layer 51 after deposition of patterned photoresist layer 250 with back edge 256 and after methanol ($CH_3OH$)-based reactive ion etching (RIE), using the photoresist layer 250 as a mask, according to the method of the invention. The layers of sensor 200 include seed layer 225, AFM layer 224, AP1 ferromagnetic layer 222 with magnetization 227, APC layer 223, AP2 ferromagnetic reference layer 220 with magnetization 221, MgO spacer layer 230, ferromagnetic free layer 210 with magnetization 211 and capping layer 212. The methanol-based RIE is performed using an inductively coupled plasma (ICP) tool, and removes the ferromagnetic material of free layer 210 and terminates at the MgO spacer layer 230 without damaging the ferromagnetic reference layer 220. The methanol-based RIE process has excellent selectivity between the etch rates of the ferromagnetic material and MgO, with the ferromagnetic material having an etch rate approximately 10 times that of MgO. Optical end point detection is used to terminate the methanol-based RIE. As a result, the free layer 210 has a precisely defined back edge 206 and thus precisely defined SH. Termination of the methanol-based RIE when the MgO layer is detected prevents any removal of the MgO so the MgO layer has the same thickness in the region below the free layer 210 as it has in the extended region beyond the back edge 206. After the methanol-based RIE, the photoresist layer 250 is removed and the region behind the back edge 206 is refilled with an insulating material, typically alumina or a $SiN_X$, which is deposited onto the MgO layer 230 in the extended region and adjacent the back edge 206 of the free layer 210.

Figure 5B:
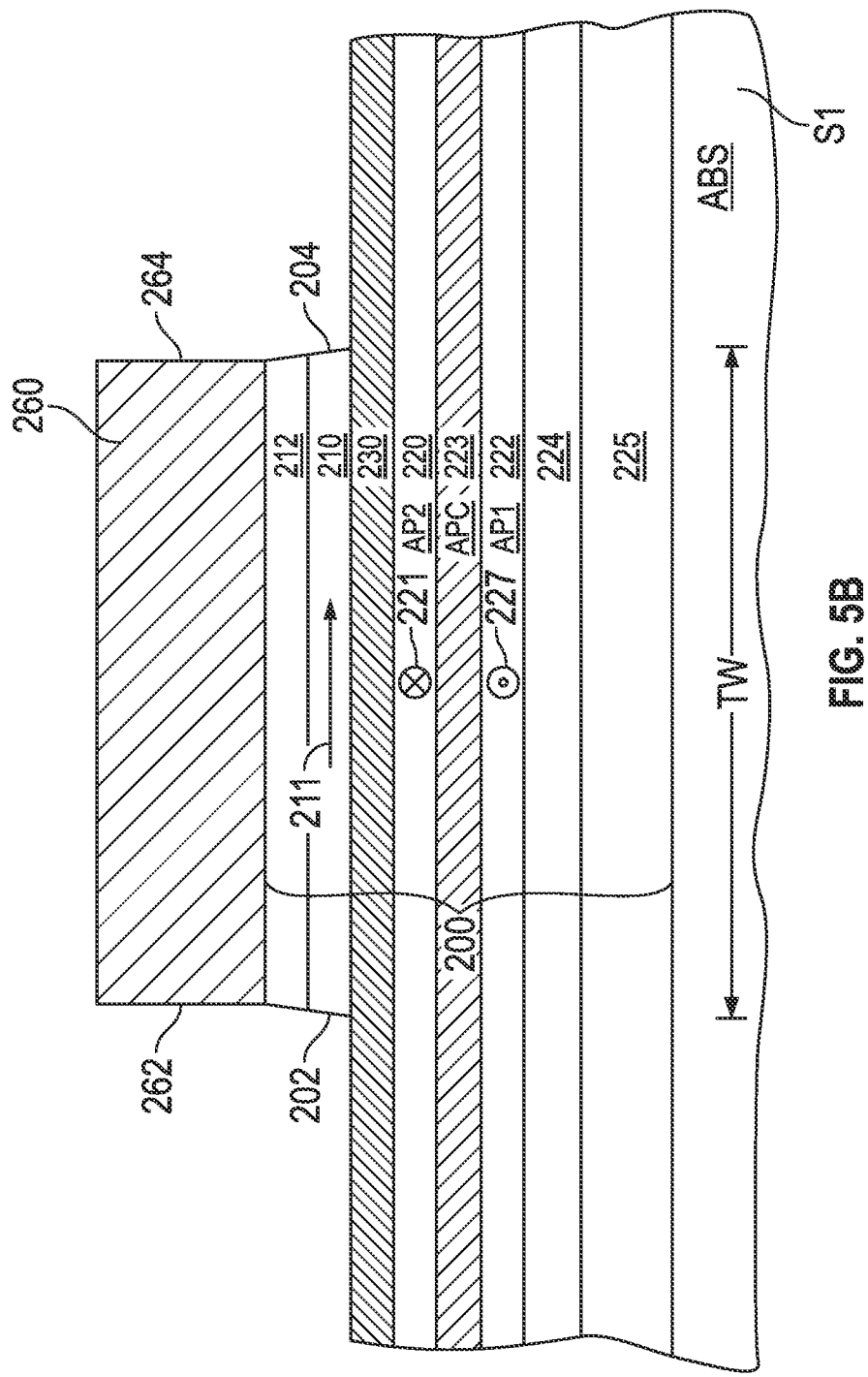
FIG. 5B is a cross-sectional schematic view showing the layers of the CPP-TMR read head with extended pinned layer according to the invention after deposition of a patterned photoresist layer and after methanol (CH$_3$OH)-based reactive ion etching (RIE) to define the free layer trackwidth (TW) according to the method of the invention.

The methanol-based RIE may also be performed in a second step if it is desired to have the extended pinned layer also extend beyond the TW of free layer 210. This is depicted in FIG. 5B, with photoresist layer 260 having side edges 262, 264. The methanol-based RIE removes the ferromagnetic material of free layer 210 and terminates at the MgO spacer layer 230 without damaging the ferromagnetic reference layer 220 in the regions extending beyond the side edges 202, 204 of free layer 210. The region milled away is then filled with an insulating layer, the ferromagnetic biasing layer and capping layer (like layers 116, 115 and 118 in FIG. 4A). After chemical-mechanical polishing (CMP), the seed layer (like layer 101 in FIG. 4A) is deposited, followed by deposition of shield layer S2, which may be electroplated.

Figure 5C:
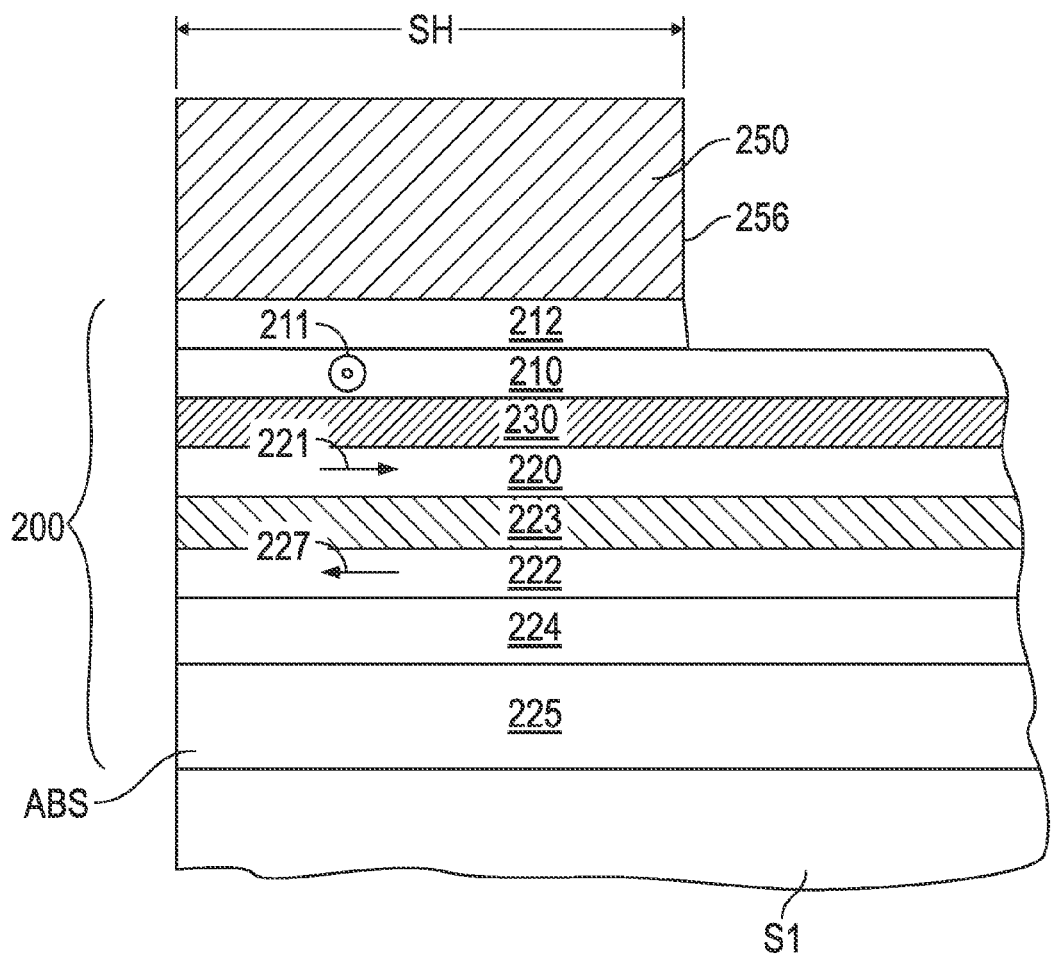
FIG. 5C is a cross-sectional schematic view showing the layers of the CPP-TMR read head with extended pinned layer according to the invention after optional ion milling of the capping layer prior to RIE of the free ferromagnetic layer.

Depending on the material chosen for the capping layer 212, the methanol-based RIE may also remove the capping layer 212 in the region beyond the back edge 206 (FIG. 5A) and also beyond the side edges 202, 206 (FIG. 5B). If the capping layer is a material such as Ta or W, it may be etched in a methanol-based RIE, although it may be preferable to etch those materials in a fluorocarbon-based chemistry (e.g. $CH_3$ or $CF_4$) and then switch to the methanol-based RIE for the free layer 210 etch. If the capping layer 212 is formed of a material like Ru, Rh, TaN or Ta or some other fairly noble metal that has a relatively slow etch rate in methanol, it may be preferable to remove the capping layer material by ion milling, and then perform the methanol-based RIE to remove the ferromagnetic material of free layer 210. FIG. 5C is a cross-sectional schematic view showing the layers of the CPP-TMR read head after the portion of the capping layer 212 not protected by resist 250 has been removed by ion milling. Following this ion milling step the methanol-based-RIE removes the portion of the free ferromagnetic layer 210 not protected by resist 250, resulting in the structure shown in FIG. 5A.

In a minor modification of the process described above, a thin, sacrificial hardmask layer may be inserted between the photoresist 260 and the capping layer 212. After transferring the photoresist image into the hardmask with the appropriate RIE process, the photoresist is stripped. The hardmask (e.g., TaN or Ta) has excellent etch resistance to methanol, and is used to protect the sensor stack during the methanol RIE of the free layer 210. It is also possible for the capping layer 212 to serve as such a hardmask.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a tunneling magnetoresistive sensor comprising:
    providing a substrate;
    depositing a first ferromagnetic layer on the substrate, a MgO spacer layer on the first ferromagnetic layer, a second ferromagnetic layer on the MgO spacer layer and a nonmagnetic capping layer on the second ferromagnetic layer;
    patterning a layer of photoresist on the capping layer, the patterned photoresist having a back edge;
    reactive ion etching (RIE) the second ferromagnetic layer in methanol to define a back edge for the second ferromagnetic layer; and
    terminating said RIE at the MgO spacer layer, leaving the MgO spacer layer and underlying first ferromagnetic layer extending beyond the back edge of the second ferromagnetic layer.

2. The method of claim 1 wherein the photoresist layer is a first photoresist layer and the RIE is a first RIE, and further comprising, after terminating said first RIE:
    removing the first photoresist layer from the capping layer;
    depositing a first electrically insulating layer on the MgO layer in the region beyond the back edge of the second ferromagnetic layer;
    patterning a second layer of photoresist on the capping layer and said first insulating layer, the patterned second layer of photoresist having two spaced-apart side edges generally orthogonal to the back edge of the second ferromagnetic layer;
    performing a second RIE in methanol of the second ferromagnetic layer to define two spaced-apart side edges for the second ferromagnetic layer;
    terminating said second RIE at the MgO spacer layer, leaving the MgO spacer layer and underlying first ferromagnetic layer extending beyond the two side edges of the second ferromagnetic layer;
    depositing a second electrically insulating layer on the MgO layer in the regions beyond the side edges of the second ferromagnetic layer;
    depositing a ferromagnetic said second insulating layer;
    depositing a capping layer on said ferromagnetic biasing layer; and
    removing the second layer of photoresist.

3. The method of claim 1 wherein depositing the capping layer comprises depositing the capping layer selected from Ru, Rh, Ta and TaN, and further comprising, prior to the RIE, ion milling the capping layer, using the patterned photoresist as an etch mask, to expose the underlying second ferromagnetic layer.

4. The method of claim 1 further comprising, after terminating the RIE, depositing an electrically insulating backfill layer on the MgO spacer layer and in contact with the back edge of the second ferromagnetic layer.

5. The method of claim 1 further comprising depositing an antiferromagnetic layer on the substrate, and wherein depositing the first ferromagnetic layer comprises depositing the first ferromagnetic layer on the antiferromagnetic layer.

6. The method of claim 1 further comprising depositing a hardmask layer on the capping layer prior to said patterning, and wherein patterning the layer of photoresist comprises patterning the layer of photoresist on the hardmask layer, transferring the photoresist pattern to the hardmask layer; and removing the patterned photoresist prior to said RIE.

* * * * *

UNITED STATES PATENT AND TRADEMARK OFFICE
CERTIFICATE OF CORRECTION

| | | |
|---|---|---|
| PATENT NO. | : 8,914,970 B2 | Page 1 of 1 |
| APPLICATION NO. | : 13/869005 | |
| DATED | : December 23, 2014 | |
| INVENTOR(S) | : Katine | |

It is certified that error appears in the above-identified patent and that said Letters Patent is hereby corrected as shown below:

In the Claim
Column 8, line 14, Claim 2, after the word "ferromagnetic" and before the word "said", insert --biasing layer on--.

Signed and Sealed this
Third Day of March, 2015

Michelle K. Lee
*Deputy Director of the United States Patent and Trademark Office*